(12) United States Patent
Bhogal et al.

(10) Patent No.: US 10,284,921 B2
(45) Date of Patent: *May 7, 2019

(54) CONSUMER-CONFIGURABLE ALTERNATIVE ADVERTISING RECEPTION WITH INCENTIVES

(71) Applicant: International Business Machines Corporation, Armonk, NY (US)

(72) Inventors: Kulvir S. Bhogal, Fort Worth, TX (US); Gregory J. Boss, Saginaw, MI (US); Sheryl L. Comes, Castle Pines, CO (US); Rick A. Hamilton, II, Charlottesville, VA (US); Anne R. Sand, Canon City, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,194

(22) Filed: Aug. 10, 2017

(65) Prior Publication Data
US 2017/0366872 A1   Dec. 21, 2017

Related U.S. Application Data

(63) Continuation of application No. 14/016,601, filed on Sep. 3, 2013, now Pat. No. 9,769,539.

(51) Int. Cl.
*H04N 21/81* (2011.01)
*H04N 21/442* (2011.01)
(Continued)

(52) U.S. Cl.
CPC ....... *H04N 21/812* (2013.01); *G06Q 30/0207* (2013.01); *G06Q 30/0241* (2013.01);
(Continued)

(58) Field of Classification Search
None
See application file for complete search history.

(56) References Cited

U.S. PATENT DOCUMENTS 6,401,059 B1     6/2002   Shen et al.
7,313,802 B1 *  12/2007   Tomsen .................. G06Q 30/02
                                                   348/E7.071

(Continued)

OTHER PUBLICATIONS

Author Unknown, Make TV More Rewarding, Webpage/site: Viggle.com, Printed from website on Aug. 28, 2013, pp. 1-5, Viggle, Inc., Published online at: http://www.functionxinc.com/post-type/pr/2012/01/.

(Continued)

*Primary Examiner* — Jason K Lin
(74) *Attorney, Agent, or Firm* — Lee Law, PLLC; Christopher B. Lee (57) ABSTRACT

An original advertisement is transformed at a first content viewing device into a transferrable incentivized deferred advertisement that itself includes as added encoded data elements a configured incentive, a configured incentive time period within which to obtain the configured incentive, and a reporting instruction that causes an alternative content viewing device to report advertisement viewing back to the first content viewing device. The transferrable incentivized deferred advertisement, that includes the added encoded data elements, is transferred to the alternative content viewing device.

20 Claims, 5 Drawing Sheets

(51) Int. Cl.
*H04N 21/258* (2011.01)
*G06Q 30/02* (2012.01)
*G06Q 50/00* (2012.01)
*H04N 7/16* (2011.01)
*H04N 21/45* (2011.01)
*H04N 21/4784* (2011.01)

(52) U.S. Cl.
CPC ............ *G06Q 50/01* (2013.01); *H04N 7/162* (2013.01); *H04N 21/25816* (2013.01); *H04N 21/25875* (2013.01); *H04N 21/44218* (2013.01); *H04N 21/44222* (2013.01); *H04N 21/4532* (2013.01); *H04N 21/4784* (2013.01)

(56) References Cited

U.S. PATENT DOCUMENTS

| | | | |
|---|---|---|---|
| 8,239,281 B1* | 8/2012 | Harlow | H04N 21/25883 705/26.1 |
| 2003/0171096 A1* | 9/2003 | Ilan | G06Q 30/02 455/3.06 |
| 2005/0177861 A1* | 8/2005 | Ma | H04N 5/4403 725/135 |
| 2006/0031918 A1* | 2/2006 | Sarachik | H04N 7/17309 725/138 |
| 2006/0127037 A1 | 6/2006 | Van Hoff et al. | |
| 2007/0169157 A1 | 7/2007 | Abernethy et al. | |
| 2008/0140509 A1* | 6/2008 | Amjadi | G06Q 30/02 705/14.1 |
| 2008/0163289 A1 | 7/2008 | Keys | |
| 2009/0271261 A1 | 10/2009 | Mehta et al. | |
| 2009/0300670 A1* | 12/2009 | Barish | G06Q 30/02 725/13 |
| 2010/0325660 A1* | 12/2010 | Holden | G11B 27/005 725/34 |
| 2011/0016498 A1* | 1/2011 | Tsuria | H04N 21/25808 725/80 |
| 2011/0135283 A1* | 6/2011 | Poniatowki | H04N 5/76 386/297 |
| 2011/0197221 A1* | 8/2011 | Rouse | G06Q 30/02 725/32 |
| 2011/0251896 A1* | 10/2011 | Impollonia | G06Q 30/02 705/14.55 |
| 2012/0110616 A1* | 5/2012 | Kilar | H04N 21/812 725/32 |
| 2012/0110620 A1 | 5/2012 | Kilar et al. | |
| 2012/0131610 A1* | 5/2012 | Fernandez Gutierrez | H04N 21/23424 725/34 |
| 2012/0291079 A1 | 11/2012 | Gordon et al. | |
| 2013/0007799 A1 | 1/2013 | Sandoval | |
| 2013/0007801 A1 | 1/2013 | Lehtonen et al. | |
| 2013/0232017 A1* | 9/2013 | Nathanel | G06Q 20/20 705/16 |
| 2014/0020017 A1 | 1/2014 | Stern et al. | |
| 2014/0129942 A1 | 5/2014 | Rathod | |
| 2014/0237498 A1* | 8/2014 | Ivins | H04H 60/31 725/14 |
| 2014/0282676 A1* | 9/2014 | Joergens | H04N 21/4758 725/23 |
| 2014/0297328 A1 | 10/2014 | Rock | |
| 2015/0032547 A1* | 1/2015 | Malhotra | G06Q 30/0267 705/14.64 |
| 2015/0052549 A1* | 2/2015 | Teixeira | H04N 21/812 725/32 |
| 2015/0067710 A1 | 3/2015 | Bhogal et al. | |
| 2015/0067714 A1 | 3/2015 | Bhogal et al. | |
| 2016/0078494 A1 | 3/2016 | Hendricks et al. | |
| 2017/0374433 A1 | 12/2017 | Bhogal et al. | |

OTHER PUBLICATIONS

Kunur Patel, Your Smartphone Is Listening in While You Watch TV, Online Journal: Ad Age, Jul. 18, 2011, pp. 1-5, Crain Communications, Published online at: http://adage.com/article/digital/big-brands-mobile-apps-direct-offers-watch-tv/228760/.

Louise Eccles, Advertisers beat fast-forward button with commercials that linger longer for the Sky+ generation, Online Journal: MailOnline, Dec. 29, 2010, pp. 1-8, Daily Mail Company, Published online at: http://www.dailymail.co.uk/news/article-1342397/Advertisers-beat-fast-forward-button-commercials-viewed-12-times-normal-speed.html.

Eric Bangeman, IBM patent could pause your DVD movie for "a word from our sponsors," ,Webpage/site: ARSTechnica.com, Nov. 25, 2007, pp. 1-4, Conde Nast, Published online at: http://arstechnica.com/uncategorized/2007/11/ibm-patent-could-pause-your-dvd-movie-for-a-word-from-our-sponsors/.

United States Patent and Trademark Office, Office Action for U.S. Appl. No. 14/016,601, dated Apr. 22, 2015, pp. 1-51, Alexandria, VA, USA.

United States Patent and Trademark Office, Office Action for U.S. Appl. No. 14/016,601, dated Oct. 19, 2015, pp. 1-71, Alexandria, VA, USA.

United States Patent and Trademark Office, Office Action for U.S. Appl. No. 14/016,601, dated Jul. 27, 2016, pp. 1-76, Alexandria, VA, USA.

United States Patent and Trademark Office, Office Action for U.S. Appl. No. 14/016,601, dated Dec. 29, 2016, pp. 1-67, Alexandria, VA, USA.

United States Patent and Trademark Office, Notice of Allowance for U.S. Appl. No. 14/016,601, dated May 15, 2017, pp. 1-13, Alexandria, VA, USA.

United States Patent and Trademark Office, Office Action for U.S. Appl. No. 14/314,599, dated Apr. 21, 2015, pp. 1-31, Alexandria, VA, USA.

United States Patent and Trademark Office, Office Action for U.S. Appl. No. 14/314,599, dated Oct. 19, 2015, pp. 1-44, Alexandria, VA, USA.

United States Patent and Trademark Office, Office Action for U.S. Appl. No. 14/314,599, dated Jul. 27, 2016, pp. 1-46, Alexandria, VA, USA.

United States Patent and Trademark Office, Office Action for U.S. Appl. No. 14/314,599, dated Jan. 3, 2017, pp. 1-56, Alexandria, VA, USA.

United States Patent and Trademark Office, Notice of Allowance for U.S. Appl. No. 14/314,599, dated May 5, 2017, pp. 1-13, Alexandria, VA, USA.

United States Patent and Trademark Office, Notice of Allowance for U.S. Appl. No. 15/674,254, dated Oct. 17, 2018, pp. 1-13, Alexandria, VA, USA.

United States Patent and Trademark Office, Office Action for U.S. Appl. No. 15/674,254, dated Apr. 19, 2018, pp. 1-52, Alexandria, VA, USA.

* cited by examiner

FIG. 4B though the original subject of the subject matter of the present invention.

CONSUMER-CONFIGURABLE ALTERNATIVE ADVERTISING RECEPTION WITH INCENTIVES

BACKGROUND

The present invention relates to consumer advertising. More particularly, the present invention relates to consumer-configurable alternative advertising reception with incentives.

Consumers are presented with advertising/commercials during and in between television and radio programming by advertisers. The advertisers utilize the advertising to increase sales of their respective products and services to the consumers. Advertising delivery models have remained relatively consistent for decades in association with television, radio, and other advertising media.

SUMMARY

A method includes, by a processor: transforming, at a first content viewing device, an original advertisement into a transferrable incentivized deferred advertisement that itself includes, as added encoded data elements, (i) a configured incentive, (ii) a configured incentive time period within which to obtain the configured incentive, and (iii) a reporting instruction that causes an alternative content viewing device to report advertisement viewing back to the first content viewing device; and transferring the transferrable incentivized deferred advertisement, that includes the added encoded data elements, to the alternative content viewing device.

A system includes a communication module; and a processor programmed to: transform, at a first content viewing device, an original advertisement into a transferrable incentivized deferred advertisement that itself includes, as added encoded data elements, (i) a configured incentive, (ii) a configured incentive time period within which to obtain the configured incentive, and (iii) a reporting instruction that causes an alternative content viewing device to report advertisement viewing back to the first content viewing device; and transfer, via the communication module, the transferrable incentivized deferred advertisement, that includes the added encoded data elements, to the alternative content viewing device.

A computer program product includes a computer readable storage medium having computer readable program code embodied therewith, where the computer readable program code when executed on a computer causes the computer to: transform, at a first content viewing device, an original advertisement into a transferrable incentivized deferred advertisement that itself includes, as added encoded data elements, (i) a configured incentive, (ii) a configured incentive time period within which to obtain the configured incentive, and (iii) a reporting instruction that causes an alternative content viewing device to report advertisement viewing back to the first content viewing device; and transfer the transferrable incentivized deferred advertisement, that includes the added encoded data elements, to the alternative content viewing device.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides consumer-configurable alternative advertising reception with incentives. This present technology provides bi-directional coupling of social networks and television advertising technology (or other advertising technologies) with advertising points accumulation, and provides several alternative advertising delivery/receipt transfer options for consumers of either "on-demand" advertising (e.g., digital video recorder (DVR) or web-based advertisements) or live broadcast advertising. Users of social media/networks may post comments regarding products or services to social networks and receive advertising points, and may opt to transfer online advertising to a television for concurrent or later viewing. Similarly, television advertisements may be selected based upon a consumer's (e.g., television viewer's) online activities, and users may opt to transfer television advertising to an online viewing forum for concurrent or later viewing. As such, the present technology provides user/viewer flexibility that may increase both user viewing of advertising and user motivation to assist advertisers with advertising efforts.

Regarding online activities associated with advertising, a social network user may indicate a "like" feature within the social network for an advertisement, and may receive a discount coupon. Companies/restaurants may reserve sending additional coupons until other social network users also indicate the "like" feature for the same or similar advertisement. As such, where social network contacts (e.g., friends) determine that another social network user has indicated the "like" feature or similar feature for an advertised product or service, the advertised product or service may become viral in nature within the social network as other social network users like the product or service to obtain a coupon.

This form of processing may be performed either via a computing device or by interaction with a social network via a television or other interface. For example, where a television viewer sees a television advertisement that they like, they may propagate that "like" from the television as a posting onto the respective social network to also obtain advertising points and/or coupons, and to initiate viral advertising of the advertised products or services that the viewer likes.

Additionally, where an advertising entity has a target configured number of viewings per consumer, and a particular consumer has accumulated enough advertising points either by direct viewing or viral distribution of additional viewings by social network contacts, the user may have the particular advertisement skipped or may opt for different/alternative advertising.

Users may accumulate advertising points by interacting with advertisements and may lose advertising points by fast forwarding. For example, with respect to advertising point accumulation, a user "liking" a website associated with an advertisement may increase advertising points. Advertising points may be redeemed as discounts/coupons for products or services shown in the associated advertisements.

Conversely, regarding losing advertising points by fast forwarding, the present technology also provides "depleting discount advertisement," that is based upon how a viewer is interacting with an advertisement. The depleting discount advertisement incentivizes viewers to watch an advertisement in its entirety. Advertisements may have a header (e.g., one inch) at the top that shows the advertiser/company name and a discount value associated with an offered product or service name. Each time the user fast forwards through the advertisement, the discount "depletes" to incentivize the user to watch the advertisement sooner rather than later. Further, if the user fast forwards at twice the viewing rate (e.g., two times (2×) speed viewing) then the discount may be stated as fifteen percent (15%) off the offered product or service. If the user presses the fast-forward selection again to increase the viewing rate (e.g., to four times (4×) speed viewing), then the discount may be decreased to five percent (5%) off the offered product or service. To further the present example, if the user again increases fast-forwarding of an advertisement (e.g., to eight times (8×) viewing speed), then the user may be provided with no (e.g., zero) discount on the respective advertised product or service. Using this form of a depleting incentive model, where the viewer watches the advertisement in real time or at a reduced fast-forward speed, the user may be provided with a range of discounts/incentives from a maximum configured discount to the least configured discount, respectively.

Advertisement overlays may also be used to preserve advertisement incorporation into the viewer's experience in combination with time and format differential transfer. As such, where a user of recorded content fast-forwards through an advertisement, the respective advertisement may be displayed as a content overlay during portions of the regular recorded programming. This form of time and format differential transfer of advertising may be provided by advertisers and the viewer's computing device or television may retrieve that alternative format for the advertisement in response to detecting the fast-forward operation through the advertisement.

As another incentive alternative, a viewer may be presented with an opportunity to watch a brief infomercial (e.g., information commercial) and/or take a quiz about an advertised product or service to receive a discount (e.g., a free box of detergent). If the viewer opts out of the incentive opportunity, the viewer may be presented with a normal advertisement with no discount. As such, viewers may be incentivized to try new products or to learn more about products they already like.

An additional incentive option that incentivizes viewers not to defer advertisement viewing may be provided by increasing an advertisement play time for each deferral by a particular individual. As such, where a viewer of an advertisement may initially be presented with a thirty (30) second advertisement, the length of view time of the respective advertisement may be increased by thirty (30) seconds for each deferral. As such, total advertisement viewing may be preserved within the context of the technology described herein for deferral and transfer of advertising by use of a variety of incentives.

Viewers may also opt to have an advertisement distributed/interspersed throughout a program rather than viewing an advertisement in a sequence from beginning to end. Within this context, advertisements may be made interactive and quizzes (as described above), may be interspersed throughout a program to ensure advertising incorporation into the viewer's experience.

Further regarding alternative advertising delivery/receipt and transfer options, a television viewer or Internet user may choose a preferred means/medium for receiving and watching advertisements. The consumers may additionally/alternatively choose a preferred alternative time, format, and/or content associated with advertising delivery and receipt by the consumer. The alternative advertising technology described herein allows the consumer to configure advertising consumption to transfer a full commercial from a television to a mobile device for immediate or delayed viewing or interaction. As another alternative advertising technology, a consumer may specify an overlay audio and/or video message format to be played as advertisements are being fast-forwarded or may specify an advertising banner overlay format to be displayed within some portion of the screen during normal viewing rather than being required to delay their preferred content viewing during timeslots occupied by advertising. The consumer may alternatively specify real-time substitution of video (or audio, audio/video) clips based on consumer behavior and preferences, as well as consumer interaction with other nearby electronic devices. The present technology is applicable to control of advertisement delivery/receipt as they are broadcast in real time or in association with advertisements that are incorporated into recorded audio/video content.

As such, the present technology allows a consumer to specify preferred advertising delivery methods/mediums, and ensures that advertisers' messages are displayed consistently with these consumer preferences. By providing consumer configurability of advertising reception, the present technology helps to preserve the viability of an advertising model, while providing both convenience for the consumer and more viewing of advertisements for the advertiser.

To implement the present technology granularly on a per consumer basis, consumers may register, in advance, his or her preferences and devices for receipt of and transfer of advertising, as described in more detail below. The registration of user preferences and devices may be performed via preference entry to a set-top box (STB), through a web interface, or via other data entry procedures as appropriate for a given implementation, again as described in more detail below.

Further, advertising distribution agreements may be made between entities, such as network broadcasters and websites that preface content with advertising videos. In such a situation, if a website user chooses to skip an advertisement video and defers that advertisement for later viewing on a television during a configured commercial advertisement timeslot, the advertisement that was skipped may be presented in lieu of other advertising to the user during that configured commercial advertisement timeslot. As such, advertisement viewings may be increased, and advertising proceeds may be partitioned between the respective network broadcasters and websites based upon factors configured by their respective agreements.

Advertising viewer (user) preferences and device configurations may be utilized to implement the present technology. As such, the processing described herein may initially check user/viewer preferences and device configuration options to determine how the viewer generally prefers to receive advertising. The viewer preferences may be stated in absolute terms (e.g., "always process advertising by . . . ") or the viewer preferences may have a conditional component. Several conditional options are possible. The following set of conditional options form a foundation upon which other conditional options may be implemented: "if motion is detected in the room, then process advertising by . . . ," or "if ambient sounds in the room exceed a threshold volume level, then process advertising by . . . ," or, "during times of day of X, process advertising by . . . ," or "during a broadcast of type Y, process advertising by . . . ," or "for this type of advertisement, process advertising by . . . " Many other conditional options for viewing preferences may be configured and all such conditional options are considered within the scope of the present technology.

User preferences may also correspond to an individual user or to a group of users (e.g., for a single family member within a household, or for an entire family). The user preferences may be stored locally (e.g., on nonvolatile memory in a set-top box (STB)), or remotely (e.g., in a remote database accessible via the Internet). The user preferences may be checked at various intervals, including at power-on, periodically (e.g., once a day, once an hour, etc.), or upon the commencement of any advertisement. Furthermore, user preferences may change based on other factors. In such cases, factors such as these may be utilized to select the respective conditional branch for user preference processing.

The user may optionally be offered an interactive choice when an advertisement is to be presented. In such an implementation, rather than defaulting to store user advertising preferences, the user may be offered a choice of advertising presentation options. The user may select whether to override the stored user advertising preferences with other options (e.g., watching the advertisement through an alternative device versus the stored preference to fast-forward with an advertisement overlay).

A brief window of time (e.g., one second) may be offered before the advertising delivery is accomplished in the selected manner. If the user takes action, such as by responsively selecting an alternative advertising option on a remote control or other device, an override may be offered and delivery of the advertisement may be accomplished through the selected alternative method.

Execution of the advertising delivery through the selected mechanism may be implemented by a variety of advertising mechanisms. For example, advertisement display options may include a traditional commercial format. Alternatively, transfer of a full advertisement from a television to a mobile device for immediate or delayed viewing (or vice versa) may be configured.

As another alternative, during a television program, transfer of a full advertisement from a television to a mobile device for immediate or delayed viewing may be performed in association with checking a web feed related to the television program and/or comments of other users about the television program. This option offers opportunities to further integrate television and mobile devices within the advertising realm.

Transference of advertisements (advertising content) utilizes several elements of the present technology. As a first technological aspect, a device and user preferences may be registered, as described above, to associate the device with a user and to specify transfer preferences for advertisements. As such, via this registration and registered user preferences, if a user elects to skip an advertisement on one device, the advertisement may be sent to an alternative configured user device by default. Note that some implementations may include a point-to-point transference operation (e.g., Bluetooth®) where the receiving device is within the applicable range of the transmitting device. Devices may further be registered using a media access control (MAC) address or other unique identifier to permit system location determination, and to allow subsequent/deferred transmission of advertisements to a device whenever the respective device comes onto the respective network for which the device is registered to receive advertisements.

As a second technological aspect, transference processing may be performed when the registered mobile device is detected on the network and the advertising content may be "pushed" to the mobile device. The management of this operation may occur at several levels. For example, a local set-top box (STB), digital video recorder (DVR), or other viewing device may manage this push over the Internet or a local intranet (e.g., home) network to ensure that the advertisement is sent to the respective user's mobile device.

Additionally or alternatively, the advertiser (e.g., content provider) may manage this push operation. In this situation, either a television programming provider (e.g., cable company) or a web-based provider may receive direct real-time feedback that the advertisement has been placed on the respective user's mobile device. An integrator service may be utilized to manage this advertisement distribution/transfer activity. Such a service may be offered, for instance, by a device or other service provider so that the user does not have to configure separate registrations with different advertising content providers.

As a third technological aspect, advertisement playback may be accomplished in a variety of different manners. The advertising content may be buffered, for example, on the mobile device and the user may be provided with the advertising content at some configured time (e.g., when the mobile device is accessed by the user). Alternatively, the user may be provided with the advertising content over some period of time, such that the user has flexibility on when to schedule the viewing over some window of time (e.g., a day, week, etc.).

As one example of the advertising transfer and deferral activity, where a user chooses to skip a thirty (30) second insurance commercial while watching an online movie, by use of the user's determined user preferences and device registration(s), certain processing may begin. For purposes of the present example, it is assumed that certain advertising points/incentives may be provided to the user for viewing the advertisement. Initially, monitoring logic (e.g., provided by a website server in this example) may detect that the user of a desktop computing device is attempting to skip the advertisement, and may determine, using database/registration look-up of the user's configuration and preferences, that the user is authorized to perform the advertisement skipping and that the user preferences indicate that the advertising content is to be deferred to the user's registered mobile device for later viewing. The monitoring logic may determine that the user's mobile device is a tablet computing device with certain logical (e.g., network) identifiers, and may further determine whether the user's tablet computing device is presently connected via an accessible network. If the tablet computing device is presently connected via an accessible network, the content may be downloaded and cached on the tablet computing device. If the tablet computing device is not presently connected via an accessible network, when the tablet computing device becomes connected to the network at a later time, the content may then be downloaded and cached on the tablet computing device. When the user opens the tablet computing device, the user sees that a new advertisement (the previously-deferred and transferred advertisement) is available to watch, and that the advertisement is configured to be watched within a prescribed window of time to obtain the respective advertising points for viewing the advertisement. The user may then, at the user's convenience, work with the tablet computing device for some period of time, then allow the advertisement to play at an opportune time that is convenient for the user, which allows the user to receive the advertising incentive(s) offered in association with viewing the advertisement.

Interactive advertising may also be configured for use in association with a mobile device for immediate or delayed interaction with advertising content. Other alternative methods may allow substitution of a television advertisement with alternative advertising content (e.g., view a banner advertisement or interactive commercial instead of the original television advertisement) to be displayed on the mobile device. Such advertisements may be configured as banners shown for some period of time and may be shown in the place/location of a background display on the mobile device. Alternatively, advertisements may be overlaid onto web content, or otherwise shown on the mobile device. Further, some options may be interactive (e.g., obtain user inputs to confirm viewing) to ensure that the user has viewed the respective advertisement or otherwise participated as desired by the advertiser.

The following is an example of an interactive advertisement presented on a mobile device. For example, on a tablet computing device, ten (10) icons may be rendered with company logos and a tag-line associated with one or more of the icons. The user may, for example, select the icons representing the respective companies to fulfill the advertisement opportunity. Again, similar to the previous examples, registration, detection, content push, and fulfillment may be accomplished in a similar manner. Alternatively, the user may play a short game on the tablet computing device that relates to the product being advertised to achieve the advertising goal, and as such, achieve advertising points for the advertising interaction.

Additionally or alternatively, advertisements may be optimized based upon speed of a detected fast-forward action by a user associated with an advertisement. An overlay audio and/or video message may be generated to play as commercials are being fast-forwarded.

Televisions, control boxes (e.g., STBs), traditional computers, and/or mobile devices displaying video may detect that an advertisement is being fast forwarded (or is likely to be fast forwarded) by a user. The respective device may then show a version of the commercial that is optimized for the speed at which it is being fast-forwarded. Methods to detect fast forwarding may include detecting a selection of a one time (1×) speed increase, a two times (2×) speed increase, a four times (4×) speed increase, an eight times (8×) speed increase, or other fast-forwarding selection by a user. Fast forwarded advertisements may be configured for such situations that convey information with increasing content/idea communication density for enhanced utilization of the respective decreases in available time of the advertisement that is being fast forwarded. For example, a video clip recorded in slow motion that is being synchronized to a one time (1×) speed increase may be played so that, in the one time (1×) speed increase, the slow-motion video clip appears to the user as a normal speed advertisement of shorter duration (equivalent and synchronized to the new adjusted length of time for the fast-forwarded advertisement). Similarly, if any level of fast forwarding speed increase has been detected and such a rate of video advancement relative to the length of the original advertisement is too short to effectively show the video clip, an advertiser's logo or other representation of the advertisement may be displayed to capture the advertising opportunity to the extent possible during the reduced timeslot of the advertisement that is being fast-forwarded.

As a further example, multiple advertisements may be configured for advanced-speed rendering, such as one advertisement optimized for the two times (2×) speed increase viewing that may be displayed in fifteen (15) seconds. Another advertisement optimized for four times (4×) speed increase viewing may be displaying in seven and a half (7.5) seconds. Another advertisement optimized for eight times (8×) speed increase viewing may be displayed in three and three fourths (3.75) seconds. Other speed increase-based optimizations are possible and all such optimizations are considered within the scope of the present technology.

Advertisements that are optimized based upon the speed of a detected fast-forward action as described above may be transmitted and received in the form of audio and/or video tracks designed particularly for the respective timeslots available relative to the respective fast-forward speeds. Such tracks may be broadcast in real time along with the primary content, may be previously stored/cached on the local system for invocation in such circumstances, or may be pulled by the rendering device from an Internet source (e.g., the advertiser's website) on demand.

Such tracks may be optimized for playback at high speeds in a full-screen manner, or may be shown in a separate window (e.g., a picture-in-picture format). In the former case of the full-screen playback, the playback unit may detect the advanced speed, and play the selected advertisement that is optimized for that speed, as described above. When fast-forwarding is detected, the appropriately optimized advertisement may be selected and played as the primary track/content advances.

In the latter case of a separate window (e.g., picture-in-picture), when a fast-forward operation is detected during an advertisement, an alternative track may be invoked and played in one of the picture-in-picture frames/windows as the user watches the silent advancing advertisement content in another picture-in-picture frame/window.

Further regarding display of an advertising banner overlay in some portion of the screen during normal viewing, a user may be presented with an option to watch an advertisement or to enable overlays instead of watching advertisements interspersed between programming content segments. As such, the viewer may be given the option of viewing advertising banner overlays or watching the advertisements in their full format.

Where a user has selected to utilize/watch advertising banner overlays instead of watching advertisements interspersed between programming content segments, if the user has not yet viewed a particular advertisement that has been skipped, then content overlays that are relevant to the skipped advertisements may be played for the viewer.

Advertising banner overlays may be configured and downloaded as a graphic image that may be overlaid at an appropriate time to display advertisements (e.g., a user is watching an event in real-time and the user is subjected to a television network commercial interruption of the event). Using the present technology, that user may instead opt into have one or more advertisement graphic overlays displayed on part of the screen instead of seeing the telecast advertisements, which may provide the opportunity to continue watching footage from the event. An advertisement graphic overlay may be either static or dynamic, and may be downloaded to the viewing system and invoked at the appropriate time. Further, the advertisement graphic overlay may be displayed on the screen for a time equal to the original advertisement or for a differing time, as appropriate for the given implementation. Additionally, the advertisement graphic overlay may be configured to occupy varying sizes on the viewing screen and may have varying degrees of transparency/opacity, depending on the selected implementation. Such alternatives may increase advertiser confidence that the respective advertising message is being watched by the viewers, and may thereby increase the value of the advertising investment.

Further regarding advertising points, different methods for viewing or interacting with advertising may account for different numbers of "points."

As an additional alternative for the present technology, fast forwarding of an advertisement may be configured to stop at the beginning of the regular program content. As such, a viewer may choose to fast-forward through the advertisements subject to the incentives described above. The user's DVR may fast-forward the advertisements for the user and stop the fast-forwarding of content at the beginning of the regular program content. The user may be incentivized, based upon such a feature, to agree to an alternative form of advertising, such as an advertising banner overlay or the transfer of the advertisement(s) to the mobile device, as described above.

It should be noted that conception of the present subject matter resulted from recognition of certain limitations associated with consumer reception of advertising. For example, it was observed that advertisers conventionally determine when and how their advertising is delivered to consumers (i.e., via television, radio, and other advertising media). As such, it was observed that many consumers opt to turn the volume down when advertising is being presented during live broadcast viewing. Alternatively, it was observed that consumers that utilize digital video recorders (DVRs) are able to fast-forward or skip-forward (e.g., in thirty-second or larger increments of time) through advertising commercials. It was further observed that advertiser revenues decline as a result of consumer inattention to advertisements. It was further observed that consumers often are presented with commercials that are not of interest to the respective consumers. In view of these several observations, it was determined that new technology that both allows consumers to defer advertisements to a later time or to a different delivery medium may improve consumer willingness to view advertising (and accordingly may improve advertiser revenues). It was additionally determined that new technology that allows consumers to specify preferred advertising format and delivery methods may also improve advertiser revenues by allowing consumers to become more engaged in the advertising process and ensuring that advertising investments reach target audiences. The present subject matter improves advertising efficiency and revenues for advertisers, and improves information flow to consumers, by providing for consumer-configurable alternative advertising reception with incentives, as described above and in more detail below. As such, improved consumer reception of advertising may be obtained through use of the present technology.

The consumer-configurable alternative advertising reception with incentives described herein may be performed in real time to allow prompt configuration of alternative forms of advertisement reception and incentives. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
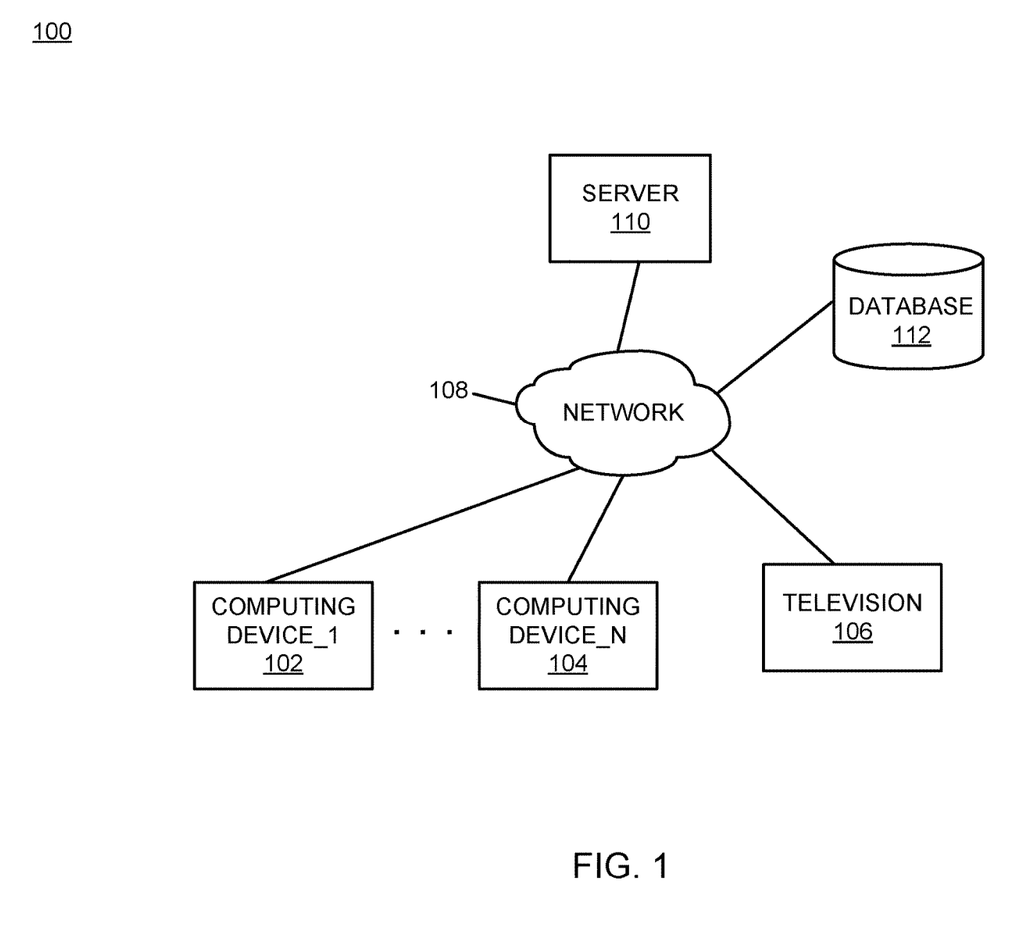
FIG. 1 is a block diagram of an example of an implementation of a system for consumer-configurable alternative advertising reception with incentives according to an embodiment of the present subject matter.

FIG. 1 is a block diagram of an example of an implementation of a system 100 for consumer-configurable alternative advertising reception with incentives. A computing device_1 102 through a computing device_N 104 and a television 106 communicate via a network 108 with a server 110. The server 110 generally represents a television content distribution system capable of distributing audio/video programming content (e.g., a cable, satellite, or other television content programming system). The network 108 generally represents a cable, satellite, Internet, or other audio/video programming content distribution technology. The server 110 also distributes advertising content for insertion into programming that is distributed for reception by the television 106 and the computing device_1 102 through the computing device_N 104. Television programming content and advertising content, along with configuration options for alternative advertising reception and advertising incentives, may be stored within a database 112. The television 106 may be any form of television appropriate for a given implementation (e.g., an Internet protocol television (IPTV), a high definition (HD) TV that receives television content via cable or over-the-air reception, etc.).

As will be described in more detail below in association with FIG. 2 through FIG. 4B, the server 110 and any of the computing device_1 102 through the computing device_N 104 and television 106 may each provide automated consumer-configurable alternative advertising reception with incentives. The automated consumer-configurable alternative advertising reception with incentives is based upon advertising incentives correlated with alternative reception options for advertising content. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a television content and advertising server, a web server, application server, or other data server device, or any other device capable of processing information as described above and in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The database 112 may include a relational database, an object database, or any other storage type of device. As such, the database 112 may be implemented as appropriate for a given implementation.

Figure 2:
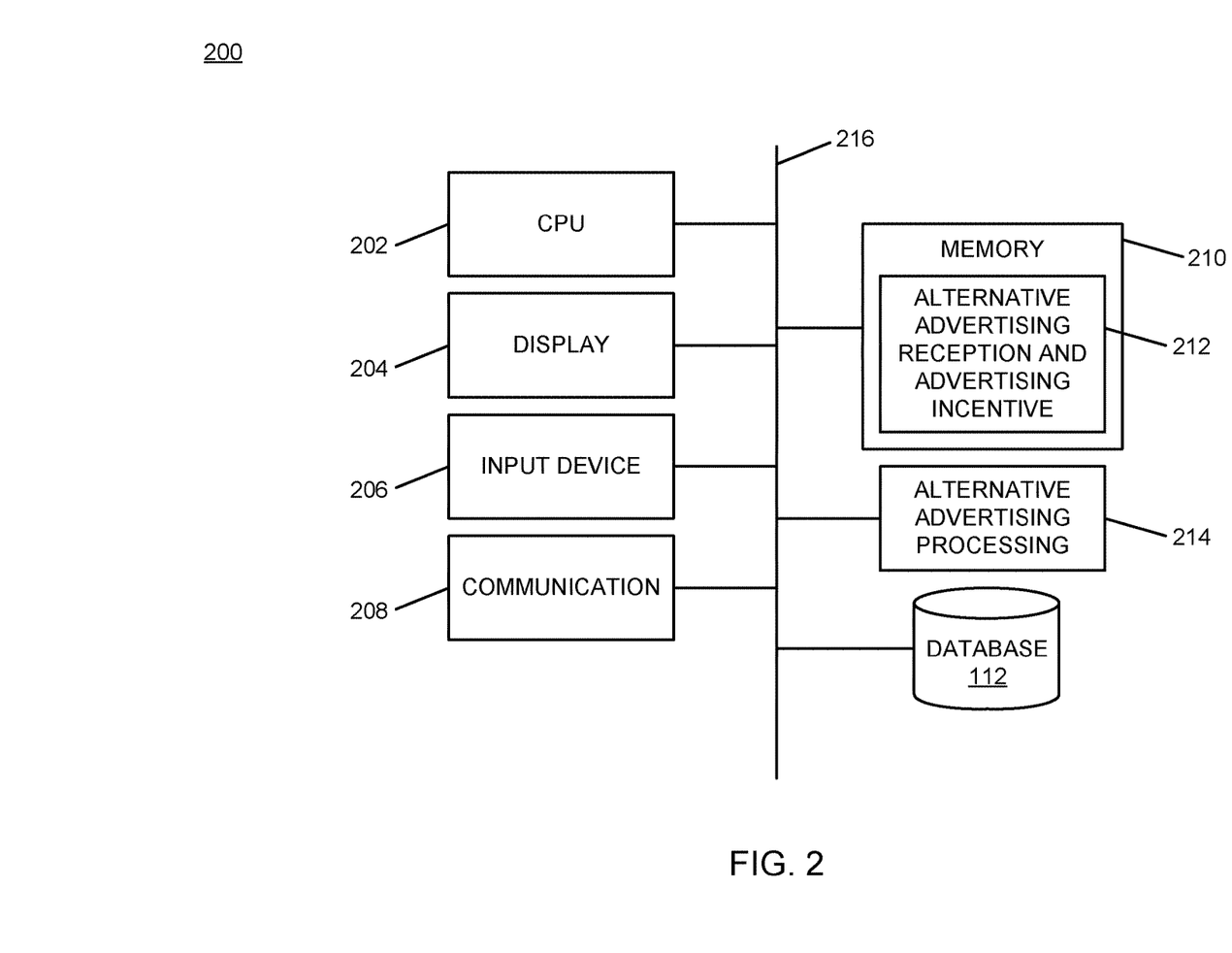
FIG. 2 is a block diagram of an example of an implementation of a core processing module capable of performing consumer-configurable alternative advertising reception with incentives according to an embodiment of the present subject matter.

FIG. 2 is a block diagram of an example of an implementation of a core processing module 200 capable of performing consumer-configurable alternative advertising reception with incentives. The core processing module 200 may be associated with any of the computing device_1 102 through the computing device_N 104, with the television 106, and/or with the server 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of advertising content and advertising incentives in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, an infrared input device, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an alternative advertising reception and advertising incentive processing and storage area 212 that stores configuration options and calculations in association with the core processing module 200. As will be described in more detail below, alternative advertising reception and advertising incentive processing options and results stored within the alternative advertising reception and advertising incentive processing and storage area 212 are used to provide bi-directional coupling of social networks and television advertising technology (or other advertising technologies) with advertising points accumulation, and provides several alternative advertising delivery/receipt transfer options for consumers of either "on-demand" advertising (e.g., digital video recorder (DVR) or web-based advertisements) or live broadcast advertising.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An alternative advertising processing module 214 is also illustrated. The alternative advertising processing module 214 provides alternative advertising delivery/receipt transfer processing, advertising incentive processing, and other processing capabilities for bi-directional coupling of social networks and television advertising technology in association with the core processing module 200, as described above and in more detail below. The alternative advertising processing module 214 implements the automated consumer-configurable alternative advertising reception with incentives of the core processing module 200.

It should also be noted that the alternative advertising processing module 214 may form a portion of other circuitry described without departure from the scope of the present subject matter. Further, the alternative advertising processing module 214 may alternatively be implemented as an application stored within the memory 210. In such an implementation, the alternative advertising processing module 214 may include instructions executed by the CPU 202 for performing the functionality described herein. The CPU 202 may execute these instructions to provide the processing capabilities described above and in more detail below for the core processing module 200. The alternative advertising processing module 214 may form a portion of an interrupt service routine (ISR), a portion of an operating system, a portion of a browser application, or a portion of a separate application without departure from the scope of the present subject matter.

The database 112 is again shown within FIG. 2 associated with the core processing module 200. As such, the database 112 may be operatively coupled to the core processing module 200 without use of network connectivity, such as the network 108, as appropriate for a given implementation.

The CPU 202, the display 204, the input device 206, the communication module 208, the memory 210, the alternative advertising processing module 214, and the database 112 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
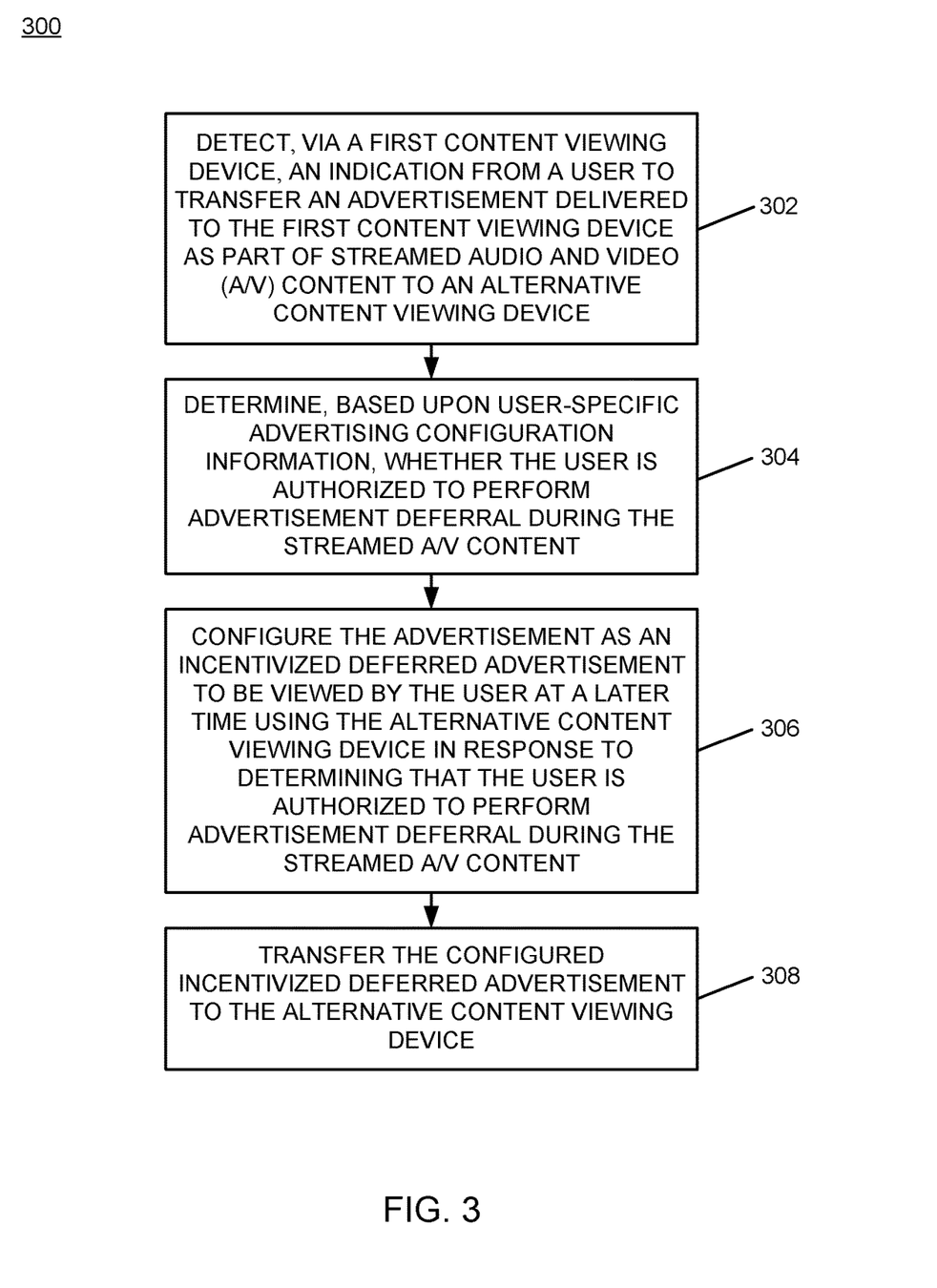
FIG. 3 is a flow chart of an example of an implementation of a process for consumer-configurable alternative advertising reception with incentives according to an embodiment of the present subject matter.
Figure 4A:
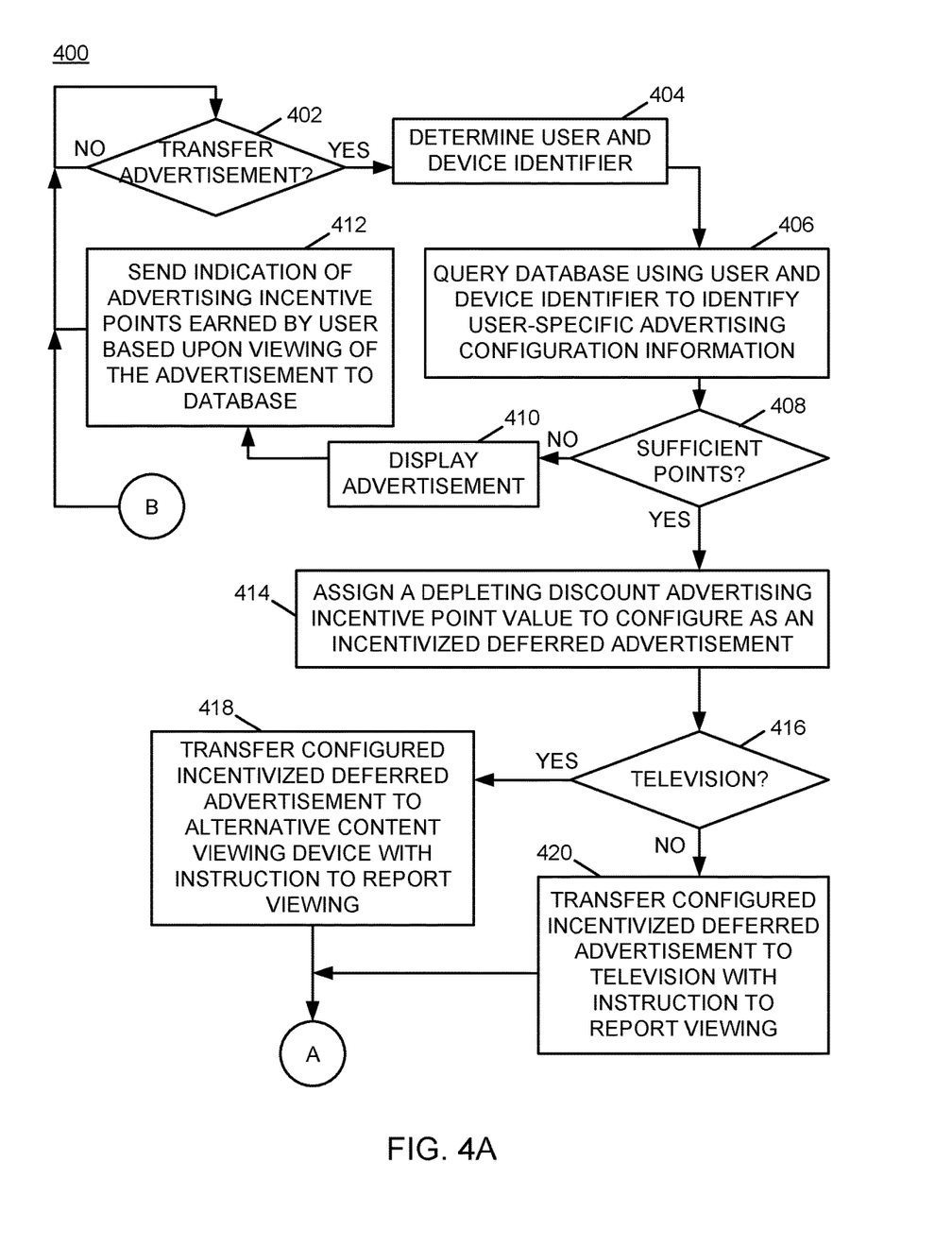
FIG. 4A is a flow chart of an example of an implementation of initial processing within a process for consumer-configurable alternative advertising reception with incentives, including depleting discount incentives and advertising appreciation discounts according to an embodiment of the present subject matter.
Figure 4B:
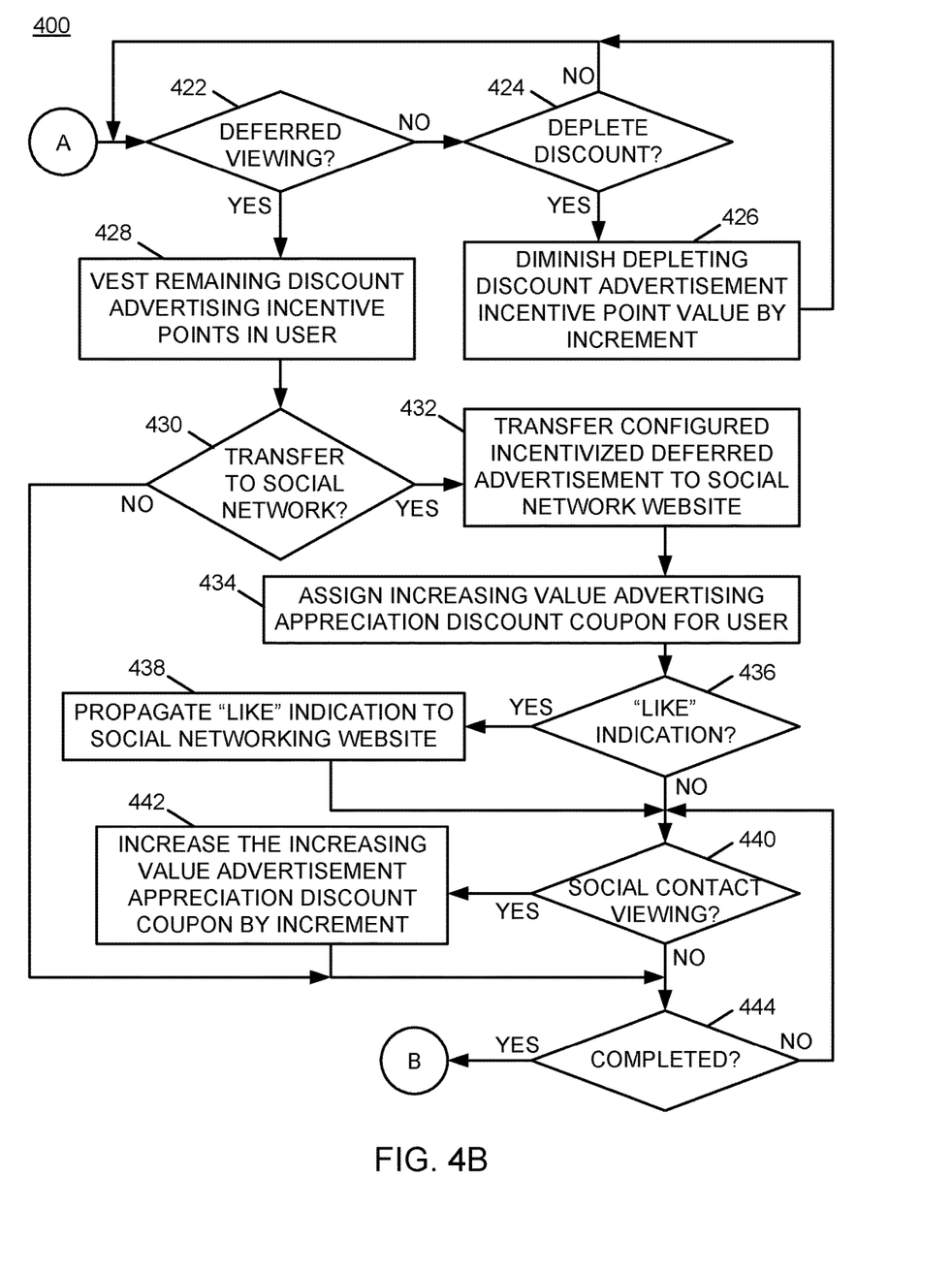
FIG. 4B is a flow chart of an example of an implementation of additional processing within a process for consumer-configurable alternative advertising reception with incentives, including depleting discount incentives and advertising appreciation discounts according to an embodiment of the present subject matter.

FIG. 3 through FIG. 4B described below represent example processes that may be executed by devices, such as the core processing module 200, to perform the automated consumer-configurable alternative advertising reception with incentives associated with the present subject matter. Many other variations on the example processes are possible and all are considered within the scope of the present subject matter. The example processes may be performed by modules, such as the alternative advertising processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for consumer-configurable alternative advertising reception with incentives. At block 302, the process 300 detects, via a first content viewing device, an indication from a user to transfer an advertisement delivered to the first content viewing device as part of streamed audio and video (A/V) content to an alternative content viewing device. At block 304, the process 300 determines, based upon user-specific advertising configuration information, whether the user is authorized to perform advertisement deferral during the streamed A/V content. At block 306, the process 300 configures the advertisement as an incentivized deferred advertisement to be viewed by the user at a later time using the alternative content viewing device in response to determining that the user is authorized to perform advertisement deferral during the streamed A/V content. At block 308, the process 300 transfers the configured incentivized deferred advertisement to the alternative content viewing device.

FIGS. 4A-4B illustrate a flow chart of an example of an implementation of process 400 for consumer-configurable alternative advertising reception with incentives, including depleting discount incentives and advertising appreciation discounts. FIG. 4A illustrates initial processing within the process 400. At decision point 402, the process 400 makes a determination as to whether an indication to transfer an advertisement has been detected. For example, the process 400 may detect an indication from a user via a first content viewing device to transfer an advertisement delivered to the first content viewing device as part of streamed audio and video (A/V) content to an alternative content viewing device. The first and alternative content viewing devices may be televisions, tablets, smartphones, computers, or any other set of content viewing devices.

In response to determining that an indication to transfer an advertisement has been detected at decision point 402, the process 400 determines a user identifier of the user and a device identifier of the first content viewing device associated with the requesting user at block 404. At block 406, the process 400 queries an alternative advertising reception and advertising incentives database using the determined user identifier and device identifier of the first content viewing device to identify the user-specific advertising configuration information. The user-specific advertising configuration information may include accumulated advertising incentive points. The accumulated advertising incentive points may be accumulated from other advertisement viewing and may be collected by viewing extended advertisements, taking quizzes, viewing an advertisement a configured number of times, or otherwise as described above and as appropriate for a given implementation.

At decision point 408, the process 400 makes a determination as to whether sufficient advertising incentive points have been accumulated by the user to allow deferral and transfer of the advertisement. As such, based upon the query to the alternative advertising reception and advertising incentives database, the process 400 may determine whether the identified user-specific advertising configuration information includes sufficient accumulated advertising incentive points to allow deferral of the advertisement delivered to the first content viewing device and transfer of the deferred advertisement to the alternative content viewing device. The process 400 may accordingly determine, based upon user-specific advertising configuration information, whether the user is authorized to perform advertisement deferral during streamed A/V content and may process the advertisement transfer request accordingly. An affirmative determination at decision point 408 will be described in more detail further below.

As such, in response to determining that sufficient accumulated advertising incentive points have not been accumulated to allow deferral and transfer of the advertisement, the process 400 displays the advertisement on the first content viewing device at block 410. At block 412, the process 400 sends an indication of advertising incentive points earned by the user, based upon the viewing of the advertisement, to the alternative advertising reception and advertising incentives database. These earned advertising incentive points may be accumulated by the alternative advertising reception and advertising incentives database and utilized by the user for future advertising deferral and transfer opportunities.

Returning to the description of decision point 408, in response to determining that sufficient accumulated advertising incentive points have been accumulated to allow deferral and transfer of the advertisement, the process 400 assigns a depleting discount advertising incentive point value to configure the advertisement for deferral as an incentivized deferred advertisement at block 414. As described above, the user may view the configured incentivized deferred advertisement that is transferred to the alternative content viewing device sooner to obtain the most accumulated advertising incentive points, and may obtain fewer advertising incentive points for viewing the advertisement at a later time.

At decision point 416, the process 400 makes a determination as to whether the current/first content viewing device to which the advertisement is initially delivered is a television. In response to determining that the current/first content viewing device to which the advertisement is initially delivered is a television, the process 400 transfers the configured incentivized deferred advertisement to an alternative content viewing device with an instruction to report viewing of the advertisement by the user at block 418. Alternatively, in response to determining at decision point 416 that the current/first content viewing device to which the advertisement is initially delivered is not a television, the process 400 transfers the configured incentivized deferred advertisement to a television with an instruction to report viewing of the advertisement by the user at block 420.

As such, the process 400 may determine at decision point 416 that the advertisement is a television advertisement presented by a television content broadcaster. Additionally, the process 400 may determine at decision point 416 that the alternative content viewing device is a networked computing device with access to a social networking website. Within this context, the process 400 may determine at decision point 416 that the user is actively viewing the audio and video (A/V) content via the television, and may detect an indication to transfer the advertisement to one or more other content viewing devices utilized by the user.

Alternatively, the process 400 may determine at decision point 416 that the advertisement is an online advertisement presented by a social network website. Additionally, the process 400 may determine at decision point 416 that the alternative content viewing device is a television. Within this context, the process 400 may determine at decision point 416 that the user is actively viewing the A/V content via the social network website using the first content viewing device, and may detect an indication from the user via the social network website to transfer the online advertisement to the television.

In response to transferring the configured incentivized deferred advertisement to the alternative content viewing device at block 418, or in response to transferring the configured incentivized deferred advertisement to the television at block 420, the process 400 transitions to the processing shown and described in association with FIG. 4B.

FIG. 4B illustrates additional processing associated with the process 400 for consumer-configurable alternative advertising reception with incentives, including depleting discount incentives and advertising appreciation discounts. At decision point 422, the process 400 makes a determination as to whether a deferred advertisement viewing event by the user on the alternative content viewing device has occurred. As described above, the advertisement as transferred may be configured with a reporting instruction to cause the alternative content viewing device to report advertisement viewing back to the original content viewing device that transferred the advertisement. This form of processing may decrease distributed processing coordination and allow the original content viewing device to track/monitor deferred viewing. Alternatively, the alternative content viewing device may track the deferred viewing of the advertisement and update the alternative advertising reception and advertising incentives database, as appropriate for the given implementation.

In response to determining at decision point 422 that a deferred advertisement viewing event on the alternative content viewing device has not occurred, the process 400 makes a determination at decision point 424 as to whether to deplete a discount associated with a depleting discount advertising incentive point value in view of a lapse of time since transfer of the advertisement to the alternative content viewing device. In response to determining not to deplete a discount associated with a depleting discount advertising incentive point value in view of a lapse of time since transfer of the advertisement to the alternative content viewing device, the process 400 returns to decision point 422 and iterates as described above.

Alternatively, in response to determining at decision point 424 to deplete a discount associated with a depleting discount advertising incentive point value in view of a lapse of time since transfer of the advertisement to the alternative content viewing device, the process 400 diminishes the depleting discount advertising incentive point value by a configured increment at block 426. As such, the process 400 may diminish the depleting discount advertising incentive point value over a configured incentive time period to incentivize the user to view the configured incentivized deferred advertisement during the configured incentive time period. The processing to diminish the depleting discount advertising incentive point value over time may include transmitting the diminished depleting discount advertising incentive point value to the alternative advertising reception and advertising incentives database, where the diminished depleting discount advertising incentive point value may be updated within the user-specific advertising configuration information. The process 400 returns to decision point 422 and iterates as described above.

Returning to the description of decision point 422, in response to determining that a deferred advertisement viewing event by the user on the alternative content viewing device has occurred, the process 400 vests the remaining discount advertising incentive points in the user (e.g., the overage remaining after any applicable discount depletions) at block 428. The processing to vest the remaining discount advertising incentive points in the user may include transmitting the vested remaining discount advertising incentive points to the alternative advertising reception and advertising incentives database, where the vested remaining discount advertising incentive points may be updated within the user-specific advertising configuration information.

At decision point 430, the process 400 makes a determination as to whether an indication from the user has been detected via the television (or other content viewing device) to transfer the advertisement to a social networking website.

Processing associated with a negative determination at decision point 430 will be described in detail further below. It should also be noted that the process 400 is represented to provide one opportunity to transfer the advertisement to a social networking website for ease of illustration and description purposes. However, the processing at decision point 430 may be performed more than once as appropriate for a given implementation.

In response to determining at decision point 430 that an indication from the user has been detected via the television (or other content viewing device) to transfer the advertisement to a social networking website, the process 400 transfers the deferred advertisement to the designated social networking website for promotion to social network contacts of the user at block 432. At block 434, the process 400 assigns an increasing value advertising appreciation discount coupon to the user-specific advertising configuration information associated with the user.

As described in more detail below, the assigned increasing value advertising appreciation discount coupon may increase in value to the user that transferred the advertisement to the social networking website in response to each social network contact that views the deferred configured advertisement either within the social networking website or as a further deferred advertisement on another content viewing device used by the respective social networking contact.

At decision point 436, in response to assigning an increasing value advertising appreciation discount coupon to the user-specific advertising configuration information associated with the user at block 434, the process 400 makes a determination as to whether the user has indicated via the television (or other content viewing device) that the user "likes" a respective good and/or service associated with the transferred advertisement. In response to determining that the user has indicated via the television (or other content viewing device) that the user "likes" the respective good and/or service associated with the transferred advertisement, the process 400 propagates, as a posting onto the social networking website to social network contacts of the user, the indication that the user likes the respective good and/or service associated with the advertisement at block 438.

In response to propagating the indication that the user likes the respective good and/or service associated with the transferred advertisement at block 438, or in response to determining at decision point 436 that the user has not indicated via the television (or other content viewing device) that the user "likes" a respective good and/or service associated with the transferred advertisement, the process 400 makes a determination at decision point 440 as to whether a social network contact of the user has viewed the advertisement transferred to the social network website by the user (e.g., a social contact "viewing").

In response to determining that a social network contact of the user has viewed the advertisement transferred to the social network website by the user, the process 400 increases the increasing value advertising appreciation discount coupon by a configured increment at block 442. As such, the process 400 may increase the increasing value advertising appreciation discount coupon by a configured increment in response to each social network contact that views the deferred configured advertisement either within the social networking website or as a further deferred advertisement on another content viewing device used by the respective social networking contact. The processing to increase the increasing value advertising appreciation discount coupon by a configured increment may include transmitting the increase of the increasing value advertising appreciation discount coupon to the alternative advertising reception and advertising incentives database, where the increase of the increasing value advertising appreciation discount coupon may be updated within the user-specific advertising configuration information.

In response to determining at decision point 440 that a social network contact of the user has not viewed the advertisement transferred to the social network website by the user, or in response to determining at decision point 430 that an indication from the user has not been detected via the television (or other content viewing device) to transfer the advertisement to an alternative content viewing device that is currently connected to a social networking website, or in response to increasing the increasing value advertising appreciation discount coupon by a configured increment at block 442, the process 400 makes a determination at decision point 444 as to whether processing is completed. In response to determining that processing is not completed, the process 400 returns to decision point 440 and iterates as described above. In response to determining, at decision point 444, that processing has been completed, the process 400 returns to the processing described in association with FIG. 4A at decision point 402. The process 400 iterates as described above.

As such, the process 400 processes advertisement transfer requests between televisions and alternative content viewing devices at the request of users. User authorization to transfer advertisements to other content viewing devices may be performed based upon advertising point accumulation that may be derived by viewing a certain number of advertisements, viewing deferred advertisements within a configured period of time, and other factors as appropriate for a given implementation. The process 400 may also transfer advertisements between a television or other content viewing device, and a social network website. The process 400 may propagate/promote user "like" indications to the social network website, and the user may obtain advertising incentive points for social network contacts that view or interact with the transferred advertisement. The process 400 increases increasing value advertising appreciation discount coupons, diminishes depleting discount advertising incentive point values, and vests advertising incentives in users that transfer advertisements over time.

As described above in association with FIG. 1 through FIG. 4B, the example systems and processes provide consumer-configurable alternative advertising reception with incentives. Many other variations and additional activities associated with consumer-configurable alternative advertising reception with incentives are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a communication module; and
a processor programmed to:
  transform, at a first content viewing device, an original advertisement into a transferrable incentivized deferred advertisement that itself as changed in form comprises added encoded data elements structured in a form of each of: (i) a configured incentive, (ii) a configured incentive time period within which to report viewing of the transferrable incentivized deferred advertisement to obtain the configured incentive, and (iii) a reporting instruction that causes an alternative content viewing device to report the viewing of the transferrable incentivized deferred advertisement back to the first content viewing device; and
  transfer, via the communication module, the transferrable incentivized deferred advertisement, that as changed in form comprises the added encoded data elements, to the alternative content viewing device.

2. The system of claim 1, where the processor is further programmed to:
send direct real-time feedback to an entity from which the original advertisement was received that the transferrable incentivized deferred advertisement has been transferred to the alternative content viewing device;
determine a user identifier of a user of the first content viewing device and a device identifier of the first content viewing device;
query an alternative advertising reception and advertising incentives database, using the determined user identifier and device identifier, to identify user-specific advertising configuration information; and
determine whether the identified user-specific advertising configuration information in the alternative advertising reception and advertising incentives database comprises accumulated advertising incentive points accumulated from other advertisement viewing sufficient to allow deferral of the original advertisement and the transfer of the transferrable incentivized deferred advertisement to the alternative content viewing device.

3. The system of claim 1, where, in being programmed to transform, at the first content viewing device, the original advertisement into the transferrable incentivized deferred advertisement, the processor is programmed to:
assign a depleting discount advertising incentive point value to the transferrable incentivized deferred advertisement; and
diminish the depleting discount advertising incentive point value over time during the configured incentive time period to incentivize a user of the first content viewing device to view the transferrable incentivized deferred advertisement during the configured incentive time period.

4. The system of claim 1, where:
the original advertisement comprises an original online advertisement presented by a social network website;
the alternative content viewing device comprises a television; and
the processor is further programmed to:
  determine that a user is actively viewing audio and video (A/V) content via the social network website using the first content viewing device; and
  detect an indication from the user via the social network website to transfer the original online advertisement to the television; and
in being programmed to transfer, via the communication module, the transferrable incentivized deferred advertisement, that as changed in form comprises the added encoded data elements, to the alternative content viewing device, the processor is programmed to:
  overlay the transferrable incentivized deferred advertisement onto the A/V content being viewed via the social network website; and
  transfer the A/V content being viewed via the social network website with the overlaid transferrable incentivized deferred advertisement to the television as part of bi-directional advertisement and content sharing between social networks and television advertising technology.

5. The system of claim 1, where:
the first content viewing device comprises a television;
the original advertisement comprises an original television advertisement presented by a television content broadcaster;
the alternative content viewing device comprises a networked computing device with access to a social networking website; and
the processor is further programmed to:
  determine that a user of the television is actively viewing audio and video (A/V) content via the television; and
  detect an indication from the user via the television to transfer the original television advertisement to the social networking website; and
in being programmed to transfer, via the communication module, the transferrable incentivized deferred advertisement, that as changed in form comprises the added encoded data elements, to the alternative content viewing device, the processor is programmed to:
  overlay one of an audio and a video message that plays as the transferrable incentivized deferred advertisement is fast-forwarded; and
  transfer the transferrable incentivized deferred advertisement with the overlaid one of the audio and the video message that plays as the transferrable incentivized deferred advertisement is fast-forwarded to the social networking website as part of bi-directional advertisement and content sharing between social networks and television advertising technology.

6. The system of claim 5, where the processor is further programmed to:
   detect an indication from the user via the television that the user likes one of a good and a service associated with the original television advertisement; and
   propagate, as part of the bi-directional advertisement and content sharing between social networks and television advertising technology, the indication that the user likes the one of the good and the service associated with the original television advertisement as a posting onto the social networking website to social network contacts of the user.

7. The system of claim 5, where the processor is further programmed to:
   assign an increasing value advertising appreciation discount coupon to user-specific advertising configuration information associated with the user; and
   increase the increasing value advertising appreciation discount coupon in response to each social network contact that views the transferrable incentivized deferred advertisement either within the social networking website or as a further deferred advertisement on another content viewing device used by the respective social networking contact.

8. The system of claim 1, where the original advertisement comprises an interactive advertisement and the transferrable incentivized deferred advertisement comprises a transferrable incentivized deferred interactive advertisement that facilitates, as configured, delayed interaction with interactive advertising content, and where the processor is further programmed to:
   detect an interaction by a user of the first content viewing device with the transferrable incentivized deferred interactive advertisement at a time after the transfer and within the configured incentive time period.

9. The system of claim 1, where, in being programmed to transform the original advertisement into the transferrable incentivized deferred advertisement, the processor is further programmed to:
   substitute, in place of the original advertisement within the transferrable incentivized deferred advertisement, an alternative audio and video (A/V) advertisement optimized for advanced-speed rendering that further comprises one of an audio and a video message that plays as the transferrable incentivized deferred advertisement is fast-forwarded.

10. The system of claim 1, where the processor is further programmed to:
    determine that a user of the first content viewing device has opted to have advertisements interspersed throughout a program rather than viewing the advertisements in a sequence from beginning to end; and
    where, in being programmed to transform the original advertisement into the transferrable incentivized deferred advertisement, the processor is programmed to transform the transferrable incentivized deferred advertisement into a set of interactive quizzes capable of being interspersed between programming content segments throughout the program.

11. A computer program product, comprising:
    a non-transitory computer readable storage medium having computer readable program code embodied therewith, where the computer readable program code when executed on a computer causes the computer to:
    transform, at a first content viewing device, an original advertisement into a transferrable incentivized deferred advertisement that itself as changed in form comprises added encoded data elements structured in a form of each of: (i) a configured incentive, (ii) a configured incentive time period within which to report viewing of the transferrable incentivized deferred advertisement to obtain the configured incentive, and (iii) a reporting instruction that causes an alternative content viewing device to report the viewing of the transferrable incentivized deferred advertisement back to the first content viewing device; and
    transfer the transferrable incentivized deferred advertisement, that as changed in form comprises the added encoded data elements, to the alternative content viewing device.

12. The computer program product of claim 11, where the computer readable program code when executed on the computer further causes the computer to:
    send direct real-time feedback to an entity from which the original advertisement was received that the transferrable incentivized deferred advertisement has been transferred to the alternative content viewing device;
    determine a user identifier of a user of the first content viewing device and a device identifier of the first content viewing device;
    query an alternative advertising reception and advertising incentives database, using the determined user identifier and device identifier, to identify user-specific advertising configuration information; and
    determine whether the identified user-specific advertising configuration information in the alternative advertising reception and advertising incentives database comprises accumulated advertising incentive points accumulated from other advertisement viewing sufficient to allow deferral of the original advertisement and the transfer of the transferrable incentivized deferred advertisement to the alternative content viewing device.

13. The computer program product of claim 11, where, in causing the computer to transform, at the first content viewing device, the original advertisement into the transferrable incentivized deferred advertisement, the computer readable program code when executed on the computer causes the computer to:
    assign a depleting discount advertising incentive point value to the transferrable incentivized deferred advertisement; and
    diminish the depleting discount advertising incentive point value over time during the configured incentive time period to incentivize a user of the first content viewing device to view the transferrable incentivized deferred advertisement during the configured incentive time period.

14. The computer program product of claim 11, where:
    the original advertisement comprises an original online advertisement presented by a social network website;
    the alternative content viewing device comprises a television; and
    the computer readable program code when executed on the computer further causes the computer to:

determine that a user is actively viewing audio and video (A/V) content via the social network website using the first content viewing device; and detect an indication from the user via the social network website to transfer the original online advertisement to the television; and in causing the computer to transfer the transferrable incentivized deferred advertisement, that as changed in form comprises the added encoded data elements, to the alternative content viewing device, the computer readable program code when executed on the computer causes the computer to:

overlay the transferrable incentivized deferred advertisement onto the A/V content being viewed via the social network website; and transfer the A/V content being viewed via the social network website with the overlaid transferrable incentivized deferred advertisement to the television as part of bi-directional advertisement and content sharing between social networks and television advertising technology.

15. The computer program product of claim 11, where:

the first content viewing device comprises a television;

the original advertisement comprises an original television advertisement presented by a television content broadcaster;

the alternative content viewing device comprises a networked computing device with access to a social networking website; and the computer readable program code when executed on the computer causes the computer to:

determine that a user of the television is actively viewing audio and video (A/V) content via the television; and detect an indication from the user via the television to transfer the original television advertisement to the social networking website; and in causing the computer to transfer the transferrable incentivized deferred advertisement, that as changed in form comprises the added encoded data elements, to the alternative content viewing device, the computer readable program code when executed on the computer causes the computer to:

overlay one of an audio and a video message that plays as the transferrable incentivized deferred advertisement is fast-forwarded; and transfer the transferrable incentivized deferred advertisement with the overlaid one of the audio and the video message that plays as the transferrable incentivized deferred advertisement is fast-forwarded to the social networking website as part of bi-directional advertisement and content sharing between social networks and television advertising technology.

16. The computer program product of claim 15, where the computer readable program code when executed on the computer further causes the computer to:

detect an indication from the user via the television that the user likes one of a good and a service associated with the original television advertisement; and propagate, as part of the bi-directional advertisement and content sharing between social networks and television advertising technology, the indication that the user likes the one of the good and the service associated with the original television advertisement as a posting onto the social networking website to social network contacts of the user.

17. The computer program product of claim 15, where the computer readable program code when executed on the computer further causes the computer to:

assign an increasing value advertising appreciation discount coupon to user-specific advertising configuration information associated with the user; and increase the increasing value advertising appreciation discount coupon in response to each social network contact that views the transferrable incentivized deferred advertisement either within the social networking website or as a further deferred advertisement on another content viewing device used by the respective social networking contact.

18. The computer program product of claim 11, where the original advertisement comprises an interactive advertisement and the transferrable incentivized deferred advertisement comprises a transferrable incentivized deferred interactive advertisement that facilitates, as configured, delayed interaction with interactive advertising content, and where the computer readable program code when executed on the computer further causes the computer to:

detect an interaction by a user of the first content viewing device with the transferrable incentivized deferred interactive advertisement at a time after the transfer and within the configured incentive time period.

19. The computer program product of claim 11, where, in causing the computer to transform the original advertisement into the transferrable incentivized deferred advertisement, the computer readable program code when executed on the computer further causes the computer to:

substitute, in place of the original advertisement within the transferrable incentivized deferred advertisement, an alternative audio and video (A/V) advertisement optimized for advanced-speed rendering that further comprises one of an audio and a video message that plays as the transferrable incentivized deferred advertisement is fast-forwarded.

20. The computer program product of claim 11, where the computer readable program code when executed on the computer further causes the computer to:

determine that a user of the first content viewing device has opted to have advertisements interspersed throughout a program rather than viewing the advertisements in a sequence from beginning to end; and where, in causing the computer to transform the original advertisement into the transferrable incentivized deferred advertisement, the computer readable program code when executed on the computer causes the computer to transform the transferrable incentivized deferred advertisement into a set of interactive quizzes capable of being interspersed between programming content segments throughout the program.

* * * * *